Sept. 9, 1958         G. E. DOUGHTON         2,851,013
FLUID MOTOR WITH FLUID ACTUATED REVERSING VALVE
Filed Sept. 7, 1954                    2 Sheets-Sheet 1
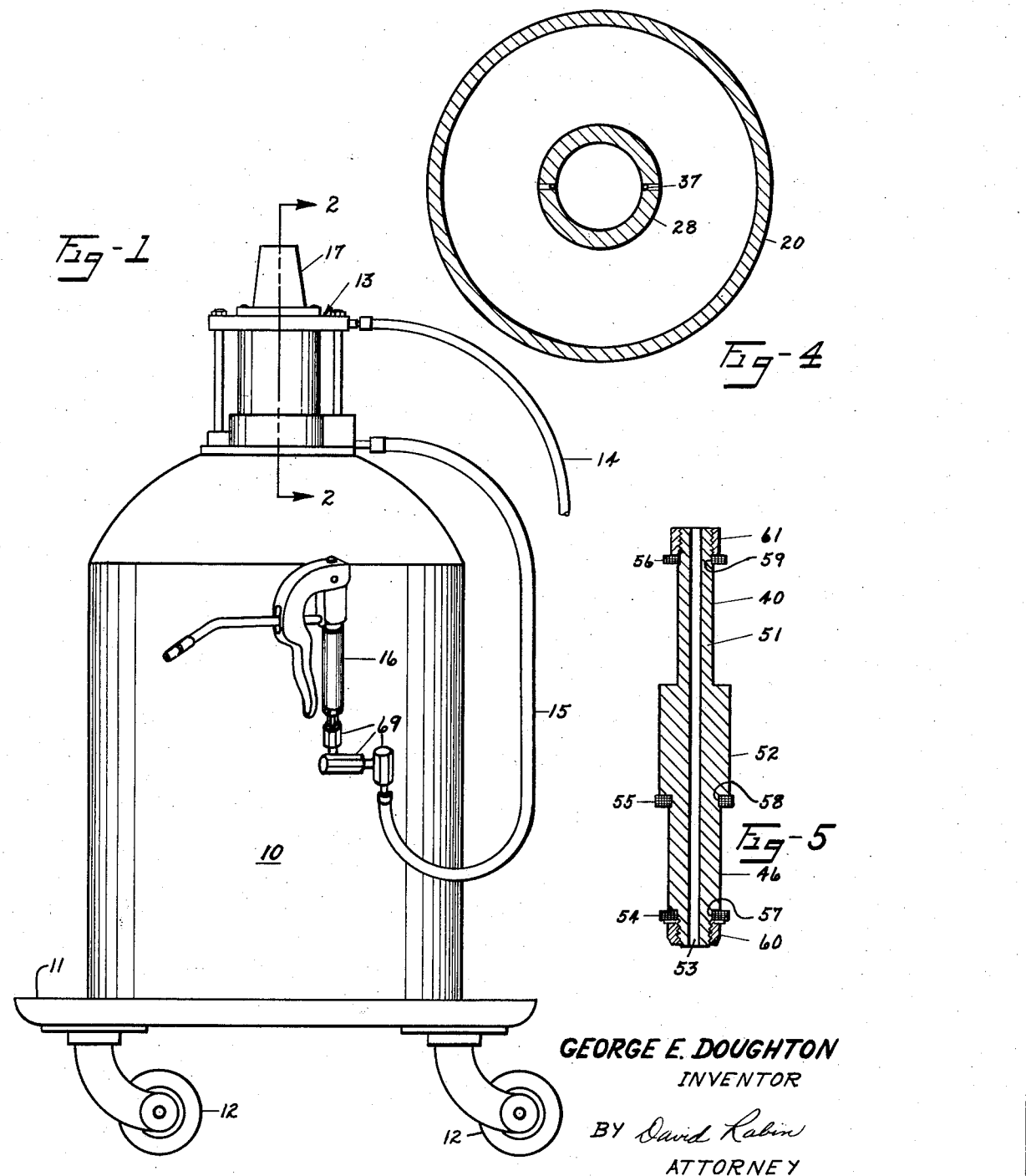
GEORGE E. DOUGHTON
INVENTOR
BY David Rabin
ATTORNEY

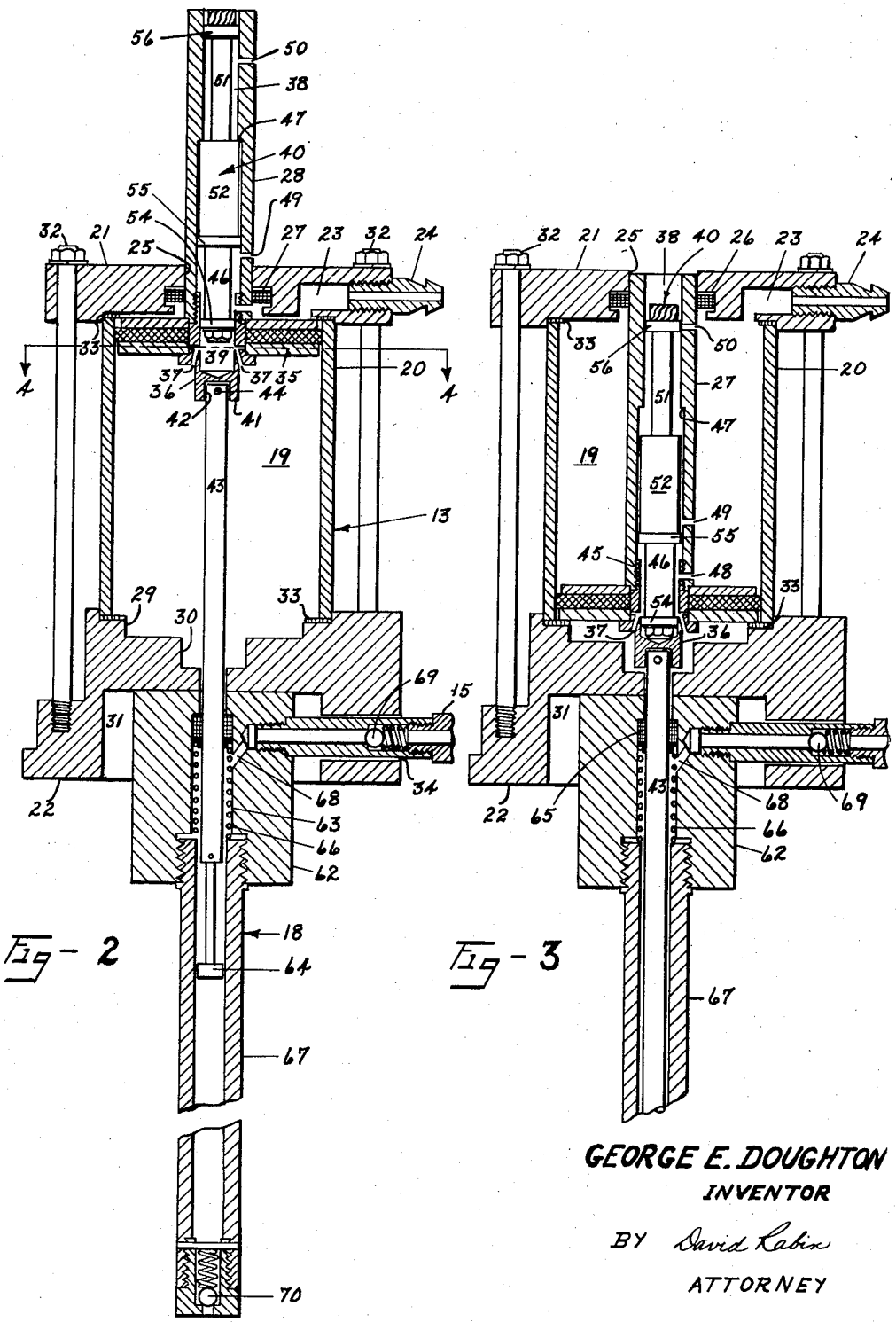

2,851,013

FLUID MOTOR WITH FLUID ACTUATED REVERSING VALVE

George E. Doughton, Durham, N. C.

Application September 7, 1954, Serial No. 454,311

7 Claims. (Cl. 121—123)

The present invention relates to a lubricant dispensing apparatus and more particularly to a fluid operated motor adapted for mounting on a lubricant storage tank for dispensing lubricant under pressure as required by actuation of a dispensing mechanism.

An object of the present invention is to provide a fluid operated motor with an automatically reciprocating piston for pumping which is actuated by a fluid under a substantially uniform pressure.

Another object of the present invention is to provide an automatically operated fluid motor which is capable of pumping a liquid to relative high discharge pressures when actuated by a relatively low pressure fluid.

Still another object of the present invention is to provide a double acting fluid motor which is actuated by a low pressure fluid with a piston reversing valve means to control piston reciprocation.

A further object of the present invention is to provide a fluid operated motor with valve means to automatically reverse piston movement under a substantially uniform inlet pressure.

Another object of the present invention is to provide a combination of a lubricant dispensing apparatus, a lubricant storage tank and a fluid operated pumping means which is capable of discharging a fluid at a high pressure level and with a rate of piston reciprocation that depends upon the volume of fluid dispensed.

Yet another object of the present invention is the combination with a lubricant dispensing apparatus, of a fluid operated pumping mechanism which has a double action reciprocable piston that is reversible automatically by a slidable valve having selectively proportioned fluid contact surface areas in order to pump a fluid to high discharge pressures and wherein the rate of piston reciprocation varies directly as the fluid discharged and the pressure of the retained fluid in the system.

Further objects of the present invention are to provide a fluid operated motor and pump mechanism that is of simple and inexpensive construction, easy to repair with a minimum number of parts, may be stopped at a selected pressure level at any piston displacement position without becoming inoperative thereafter, requires no restoring springs and adjusting needle valves for continued operation.

Other objects and advantages will be readily apparent to those skilled in this art during the course of the following general and detailed description of one embodiment of the present invention had in conjunction with the accompanying drawings which form a part of this specification and in which:

Fig. 1 is front elevational view of a lubricant dispensing apparatus embodying the present invention;

Fig. 2 is an enlarged vertical longitudinal sectional view taken substantially along the plane of line 2—2 of Fig. 1 omitting the top cover member and illustrating one position of motor operation, and also including the lubricant pumping piston and casing;

Fig. 3 is an enlarged vertical longitudinal view similar to Fig. 2 illustrating the movement of the motor components in a changed position;

Fig. 4 is a sectional view substantially along the plane of line 4—4 of Fig. 2;

Fig. 5 is an enlarged vertical longitudinal sectional view of the spool valve.

Referring to the drawings in which like numerals designate the same parts throughout the several views, and more particularly to Fig. 1 wherein there is illustrated a combination constructed in accordance with the present invention and comprising broadly a lubricant storage tank 10 mounted on a trough base 11 which is provided with casters 12, affording mobility for the entire lubricant dispensing apparatus, a fluid operated motor 13 mounted at the top of the storage tank 10 and supplied with an actuating pressure fluid through an inlet hose line 14 to operate the fluid motor in order to pump a lubricating medium under pressure from the tank 10 through the high pressure discharge line 15 to the manually operated lubricant dispensing mechanism 16 which may be fitted with suitable adapters for use with a particular lubrication application.

Although for the purposes of this specification the low pressure medium or actuating fluid described will be compressed air it is to be understood that other fluids, liquid or gaseous, may be employed with equally satisfactory results. Furthermore, the fluid operated motor may be incorporated in other devices which require accurate piston displacement to control movement of a machine element, such as drill movement or cutting tool movement in preselected increments.

In Figs. 2 and 3 there is illustrated, in section, a fluid operated motor 13 without the storage tank 10 and dispensing mechanism 16 and with the top cover cap 17 removed and also the pump casing and piston 18 shown in partial section. The cylinder 19 of the fluid operated motor 13 is formed from the tubular sleeve 20 which is closed by the head plate 21 at one end and by the base mounting plate 22 at the other end. The head plate 21 is provided with a transverse inlet passageway 23 and a hose adapter 24 for the introduction of a suitable fluid actuating medium from a pressure source into the cylinder 19.

The head plate 21 is provided with a central bore 25, and a gasket recess 26 for the sealing ring gasket 27 to slidably guide the tubular piston sleeve 28 in the cylinder 19. Base mounting plate 22 has a piston stop shoulder 29 and a plug recess 30 within the cylinder 19 and a cavity 31 at the opposite side of the plate to receive pump casing and piston 18. Suitable fastening means, such as the bolts and nuts 32, clamp the head plate 21, the base mounting plate 22, and the tubular sleeve 20 therebetween together as a unit to form the enclosed piston cylinder 19. Ring gaskets 33 at the sleeve edges seal the cylinder 19 against leakage. As illustrated in the present embodiment, the base mounting plate 22 may be drilled to form an opening through which the high pressure discharge line 15 is passed.

A tubular piston rod or sleeve member 28, internally threaded at the cylinder end, is slidably retained within the head plate central bore 25 and extends into the cylinder 19 to support at one end the fabricated main piston 35 thereon. A piston retaining plug 36 which has substantially axial passageways 37 leading into the interior 38 of the sleeve member 28 is in threaded engagement with the end of the sleeve member to maintain the piston 35 in position on the sleeve member. The inside of the plug 36 is recessed at 39 to receive and provide an end stop in one direction of displacement for a spool valve 40, and the outer end 41 of the plug 36 is recessed at 42 to receive one end of the rod 43 which is fastened to the plug 36 by the pin 44.

The threaded end 45 of the plug 36 which contains the recess 39 is sufficiently large to slidably receive the end of the reduced portion 46 of the spool valve 40. Extending axially from the threaded end 45 of the plug 36 is the interior 38 of the sleeve member which has an annular shoulder 47 spaced intermediate the sleeve length.

Selectively spaced axially along the length of the sleeve member 28 is a group of transverse ports 48, 49, and 50, all of which communicate with the interior 38 of the sleeve member. The various ports may admit or exhaust air from the cylinder 19 according to the reciprocating position of the piston and the sleeve member and the spool valve 40 during an operating cycle, and to be described hereinafter. It will then become readily apparent how the piston displacement and the location of the spool valve 40 within the sleeve member 28 will govern the direction of compressed air flow.

The port 48, designated as the first port, is positioned at the inner end of the sleeve member 28 adjacent the upper side of the piston 35 and intermediate the reduced portion 46 of the spool valve 40 when the valve is in the extreme outward position. In the initial position, illustrated in Fig. 2, the first port 48 is in registry with the inlet passageway 23 in the head plate 21 and the cylinder 19 to receive compressed air introduced into the motor through the inlet line 14. Spaced axially from the first port 48 is a second port 49 which in Fig. 2 is shown to be open to the atmosphere since it is above the head plate 21. In this sleeve uppermost position, like the first port 48, the second port communicates with the sleeve interior 38 adjacent the reduced valve stem portion 46 when the valve is in its extreme outward position against the shoulder 47. A third port 50 is located at the outer end of the sleeve member 28 and it also communicates with the sleeve interior 38 but adjacent a second reduced stem portion 51 of the valve 40 when the valve is in the position illustrated in Fig. 2.

The spool valve 40, shown in an enlarged section in Fig. 5, is provided with spool sections 46, 51, and 52 which have relatively proportioned end surface areas upon which the compressed air introduced into the sleeve interior may exert correspondingly relative forces to displace the spool valve in the direction of the greatest summation of forces exerted on the respective areas. An axial vent core 53 extends longitudinally through the valve 40 to exhaust air from the bottom side of the piston 35 on the downward stroke since the valve will be forced to the upward position. Washers 54, 55, and 56, made of a suitable material such as leather, rubber, Teflon, or nylon may be employed to obtain the requisite seal for the proportioned end surface areas at the spool sections 46, 52, and 51 in order that the compressed air exert full pressure on the respective surface areas to displace the spool valve 40 from one position to another. Suitable grooves 57, 58, and 59 in the spool valve and fastening means, such as the nuts 60 and 61, will retain the disk washers in position. It will be readily appreciated that an integral spool valve member having the relatively proportioned surfaces required may be substituted in place of the one illustrated since it is within the contemplation of this invention that a spool valve of polystyrene or nylon or other suitable synthetic material may be used in place of one made of metal and having non-metallic washers.

On the bottom side of the base mount 21 is a cavity 31 which receives the block 62 in which is drilled an axial opening 63 to support and guide the rod 43 on which a secondary piston 64 is fixed. A sealing ring 65 which is urged upwardly by a sealing ring retaining spring 66 prevents seepage into the fluid motor cylinder 19. The other end of the retaining spring 66 is forced upwardly by one end of the casing 67 which threadably engages the opening at the bottom of the block 62. The block 62 is also provided with a fluid discharge passageway 68 into which a suitable check valve 69 is inserted to provide unidirectional flow of the pumped pressure fluid. A high pressure discharge line 15 may be connected to the discharge side of the check valve 69 to conduct the pumped fluid to a lubricant dispensing mechanism 16 which has freely swingable fittings 69 facilitating manipulation of the dispensing mechanism. Since the lubricant dispensing mechanism 16 is of conventional design and any of the typical grease guns may be employed for dispensing the lubricant a description of this particular mechanism will be omitted. The other end of the casing 67 which is to be inserted into the storage tank 10 and immersed in the lubricating fluid is provided with a foot valve or check valve 70 to eliminate priming.

*General operation*

To this point the various elements of the fluid operated motor have been described specifically with reference to construction details, now the operation of the fluid motor 13 will be described as employed in combination with a lubricant dispensing apparatus. Compressed air is introduced from a compressor and will flow through the inlet pressure line 14 to the inlet recess 23 in the head plate 21. Air pressure will build up almost instantaneously and simultaneously in the recess 23 and the sleeve interior 38 and also air pressure will build up against the top side of piston 35 to force it downwardly. The compressed air admitted through the first port 48 in the sleeve member 28 will urge the spool valve to slide upwardly until it reaches the limit shoulder 47.

As the piston 35 moves downwardly in the cylinder 19 any back pressure that may build up on the bottom side of the piston is relieved through the axial vent passageways 37 in the end of the plug 36 and the vent core 53 in the spool valve 40 when the latter is in the upward position. Although the second port 49 is vented to the atmosphere initially, sufficient force is exerted upwardly on the bottom surface of washer 55 in excess of the total force acting downwardly on the surface of washer 54 and the force due to atmospheric pressure acting on the surfaces of washer 56 and the top of the spool section 52 to slide the valve upwardly and keep it in this position during the downward stroke of the piston. Continued downward movement of the sleeve member 28 will then cover the second port 49. As the piston 35 moves downwardly the secondary piston 64 and rod 43 move in the same downward direction to close the bottom check valve 70 and fluid entrained in the casing 67 will be pumped out of the casing 67 since there is sufficient clearance between piston 64 and the interior of the casing for a fluid to be passed therebetween. As the piston 35 approaches the bottom of the working stroke the third port 50 will enter the cylinder 19 and compressed air will then flow into the third port 50. Since the surface areas of washers 54, 55, and 56 are relatively proportioned, once the third port 50 enters the cylinder the forces acting downwardly, that is, on the top of the washer surface areas 54, 55, and 56, will exceed the forces acting upwardly on the bottom surface areas and the valve 40 will be displaced downwardly against the bottom of the recess 39 in the plug 36. In this position, clearly shown in Fig. 3, the axial vent core 53 in the spool valve 40 will be closed and the entering compressed air from the top part of the cylinder 19, above the piston 35, will then flow through the first port 48 into the sleeve interior 38 and then downwardly through the axial passageways 37 in the plug 36 to act upwardly against the bottom of the piston 35 forcing it upwardly as the spool valve 40 is forced downwardly. It will be readily apparent to one skilled in the art that by proportioning the fluid contacting surface areas either on the spool valve or the piston the speed of the operating cycle may be varied. In the design of the present embodiment the total exposed surface area of the bottom side of the piston 35 and the area of the plug 36 is greater than the top surface of the piston 35 which area is reduced by the area of the hollow sleeve member 28. Thus the piston 35 and sleeve member 28 are forced upwardly. As soon as the reversing action occurs and the spool valve 40 is shifted to its bottom position the disk washer 56 will cover the third port 50 and it will block the air from flowing out of the cylinder 19 above the piston 35. The spool valve 40 will remain in the downward position in the sleeve member 28 against the bottom of the plug 36 due to the greater total downward force acting on the valve surface areas. As the sleeve member 28 approaches the topmost position the second port 49 will then pass beyond the gasket 27 and out above the head plate 21 and rapidly vent the sleeve interior 38 thereby reducing the downward forces acting on the spool valve 40. When this occurs the valve 40 will be raised due to the greater forces acting upwardly, now permitting the alternate reciprocating cycle to be repeated as previously described. During upward movement of the piston 35 the rod 43 and secondary piston 64 will create a sufficient suction action to lift the check valve 70 at the bottom of the casing 67 so that lubricant will be drawn from the storage tank 10 into the casing 67. When the secondary piston 64 is forced down by the downward action of piston 35 the check valve 70 will close and the lubricant within the casing will be forced around the clearance provided by the piston 64 into the recess 63 and through tthe passageway 68 and check valve 69 toward the dispensing mechanism 16. With sufficient pressure built up within the discharge side of the system the fluid motor will cease operating at any piston position. Then as the lubricant dispensing mechanism is operated to dispense the pumped pressure lubricant and the pressure on the discharge pressure side is decreased, the fluid motor will commence reciprocating automatically until the desired discharge pressure is again obtained. The fluid motor is capable of restarting automatically again after stopping at any position in the cylinder.

Obviously many modifications and variations may be made in the construction and arrangements of the elements in the light of the above teachings without departing from the real spirit and purpose of the invention. It is therefore to be understood that within the scope of the appended claims many modified forms of structure as well as use of mechanical equivalents may be reasonably included and modifications are contemplated.

What is claimed is:

1. A fluid operated motor comprising; a cylinder having an inlet port at one end for introduction of a pressure fluid, a piston reciprocable in the cylinder, a hollow spool member supporting said piston, said spool member having a series of selectively spaced ports communicating with the interior of the spool member, a spool valve having an axial vent core to vent the fluid from the cylinder through the spool member ports, said spool valve slidably retained in the interior of the spool member and having relatively proportioned shoulder areas spaced axially to cooperate with the spaced ports on the sleeve member, said spool valve being shifted oppositely to the direction of the piston displacement to control automatically the alternate reciprocation of the piston upon pressure fluid admission.

2. A fluid operated motor comprising; a cylinder having an inlet port at one end for introducing an actuating fluid into the cylinder, a piston movable in the cylinder, a hollow spool member supporting said piston, said spool member having a series of ports axially spaced from each other and end openings therein communicating with the spool member interior, and a spool valve having an axial vent core to form a conduit between said spool member end openings to vent a fluid from the cylinder, said valve being axially slidable within the spool member and having means thereon for controlling fluid flow within the spool member to automatically regulate the direction of piston displacement.

3. A fluid operated motor comprising an enclosed cylinder having an inlet port for introduction of a pressure fluid therein, a tubular sleeve member having end openings and axially spaced ports communicating with the sleeve member interior, a piston supported on said sleeve member and slidable in opposite directions within said cylinder upon admission of a pressure fluid, and valve means having an axial core to vent a fluid from the cylinder through the sleeve member end openings, and valve means within the sleeve member to control the direction of piston displacement automatically upon admission of an actuating pressure fluid.

4. A fluid operated motor comprising an enclosed cylinder having an inlet port for introducing a pressure fluid into the cylinder, a tubular sleeve member slidably retained within the cylinder and having end openings and axially spaced ports communicating with the sleeve member interior, a piston mounted on one end of the spool member in said cylinder, and valve means having an axial core to vent a fluid from the cylinder through the sleeve member end openings, said valve means being slidably movable between fixed limits in the sleeve member to automatically control piston reciprocation upon admission of a pressure fluid into the cylinder.

5. A fluid operated motor comprising an enclosed cylinder having an inlet port for introducing a pressure fluid into the cylinder, a tubular sleeve member slidably retained by the cylinder at one end thereof and having end openings and axially spaced ports communicating with the sleeve member interior, a piston mounted on one end of said sleeve member, and valve means having an axial core to vent a fluid from the cylinder through the sleeve member end openings, said valve means having selectively spaced and relatively proportioned surface areas, said valve means being slidably displaceable between fixed limits in cooperation with the axial ports and in a direction opposite from the piston displacement to control the direction of fluid flow at one end of the piston reciprocating stroke.

6. A fluid operated motor comprising an enclosed cylinder, a head plate on the end of the cylinder, said head plate having an inlet port for the introduction of a pressure fluid into the cylinder, a tubular sleeve member slidable axially in the head plate into the cylinder, a piston supported on said sleeve member, said sleeve member having axially spaced ports communicating with the sleeve member interior, a plug on said sleeve member to retain the piston on the sleeve member, said plug having a vent passage communicating with the sleeve interior, a hollow spool valve displaceable between fixed limits in the sleeve member, spaced shoulders of relatively proportioned fluid contact areas on said valve whereby upon introduction of a pressure fluid into the inlet port the piston will be displaced in one direction and simultaneously fluid will enter one of the ports on the sleeve member to shift the valve in the opposite direction and upon reaching the end of the piston movement the valve will be shifted automatically to an opposite position diverting the pressure fluid to cause reversed piston movement.

7. A fluid operated motor comprising an enclosed cylinder having an inlet port for admission of an actuating pressure fluid, a piston slidable in said cylinder, a hollow sleeve member having a series of axially spaced ports and a vent opening at one end communicating with the sleeve interior, a piston retaining plug to support the piston on the sleeve member, said plug having an opening leading into the interior of the sleeve member from the opposite side of the piston from the location of the axially spaced ports, a hollow spool valve slidably retained within the interior of the sleeve member and having spaced shoulders with relatively proportioned surface areas thereon and an axial vent core therethrough whereby upon admission of an actuating fluid into the cylinder on one side of the piston fluid will flow through one of said ports of displace the spool valve in an opposite direction from piston displacement and back pressure in said cylinder will be vented through the spool valve core.

References Cited in the file of this patent

UNITED STATES PATENTS

| | | | |
|---|---|---|---|
| 208,449 | Winchester | Sept. 24, | 1878 |
| 271,781 | Grazelle | Feb. 6, | 1883 |
| 931,449 | Mauss | Aug. 17, | 1909 |
| 955,296 | Tripplehorn | Apr. 19, | 1910 |
| 1,031,340 | Howard | July 2, | 1912 |
| 1,032,689 | Martens | July 16, | 1912 |
| 1,858,979 | Banks | May 17, | 1932 |
| 2,060,180 | Davis | Nov. 10, | 1936 |
| 2,277,641 | Harter | Mar. 24, | 1942 |
| 2,457,721 | Price | Dec. 28, | 1948 |